Patented June 5, 1951

2,556,102

UNITED STATES PATENT OFFICE 2,556,102

2-AMINOALKYL-9-FLUORENONES

Stephen M. Olin and Otis E. Fancher, Elkhart, Ind., assignors to Miles Laboratories, Inc., Elkhart, Ind., a corporation of Indiana No Drawing. Application August 31, 1950,
Serial No. 182,626

4 Claims. (Cl. 260—247.7)

This invention relates to novel compounds having antispasmodic and analgesic properties and characterized by the general formula:

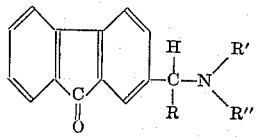

where R is a member of the group consisting of H and alkyl, and (R'+R'') N— is morpholinyl or piperidinyl. Acid salts of these new compounds may be prepared by simple treatment with an acid and are included within the scope of the invention.

In our co-pending application Serial No. 140,348, filed January 24, 1950, we have disclosed the preparation of fluorene compounds having the general formula:

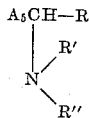

where Ar may be

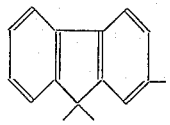

(R'+R'') N— may be morpholinyl or piperidinyl, and R is alkyl.

In accordance with the present invention we have discovered that the physiological activity of fluorene derivatives, of the general formula:

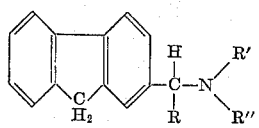

where R is H or lower alkyl, and where the amine moiety

is morpholinyl or piperidinyl, is unexpectedly increased with respect to antispasmodic and/or analgetic activity, by oxidation of the methylene function in the 9- position to a keto function.

The compounds of the present invention are prepared by the oxidation of such fluorene compounds, as illustrated by the following specific examples.

Example 1

Preparation of 2(1'-piperidinyl-ethyl)-9-fluorenone hydrochloride, having the formula:

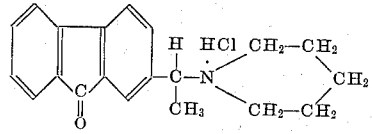

A. 2-(1'-piperidinly-ethyl) fluorene was prepared by heating together 20.8 g. of 2-acetylfluorene, 51 g. of N-formyl piperidine (prepared from piperidine and formic acid) and 3 g. of magnesium chloride hexahydrate, to a temperature of 190° C. and refluxing for 20 hours. The reaction mixture was poured into water, acidified with hydrochloric acid and heated to boiling. The mixture was then filtered, the filtrate made basic with NaOH and extracted with ether.

B. Forty grams of the resulting 2-(1'-piperidinyl-ethyl) fluorene, 60 g. of sodium dichromate dihydrate, 100 cc. of water and 900 cc. of acetic acid were refluxed for five hours. The acetic acid was removed by distillation under reduced pressure and the residue combined with 500 cc. of 5% ammonium hydroxide. The basic suspension was extracted with ether and the ethereal solution extracted with 100 cc. of 2 N hydrochloric acid. On cooling 22 g. of 2-(1'-piperidinyl-ethyl)-9-fluorenone hydrochloride, having a M. P. of 283-4° C. (decomp.) crystallized from the acid extract.

Example 2

Preparation of 2(4'-morpholinyl-methyl)-9-fluorenone hydrochloride having the formula:

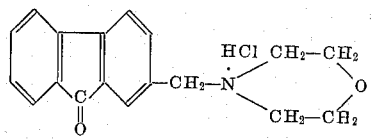

The process of Example 1 above was repeated with the exception that 2-[(4'-morpholinyl)-methyl]-fluorene hydrochloride was substituted for 2-(1'-piperidinyl-ethyl) fluorene. The resulting 2(4'-morpholinyl-methyl)-9-fluorenone hydrochloride had an M. P. of 283-5° C. (decomp.).

Example 3

Preparation of (2(1'-piperidinyl-butyl)-9-fluorenone hydrochloride having the formula:

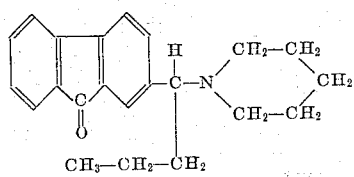

The process of Example 1 above was repeated with the exception that 2(1'-piperidinyl-butyl)-fluorene hydrochloride was substituted for 2-(1'-piperidinyl-ethyl) fluorene hydrochloride. The resulting crystals of 2(1'-piperidinyl-butyl)-9-fluorenone hydrochloride has a melting point of 254–5° C. (decomp.).

We claim:
1. The compounds of the formula

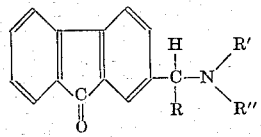

wherein R is a member of the group consisting of H and alkyl, and

is selected from the group consisting of morpholinyl and piperidinyl, and salts thereof.
2. 2(1'-piperidinyl-ethyl)-9-fluorenone.
3. 2(4'-morpholinyl-methyl)-9-fluorenone.
4. 2(1'-piperidinyl-butyl)-9-fluorenone.

STEPHEN M. OLIN
OTIS E. FANCHER.

No references cited.